United States Patent [19]

Chattha et al.

[11] Patent Number: 5,086,026
[45] Date of Patent: Feb. 4, 1992

[54] REDUCTION CATALYST WITH MODIFIED RHODIUM STRUCTURE

[75] Inventors: Mohinder S. Chattha, Northville, Mich.; William L. H. Watkins, Toledo, Ohio

[73] Assignee: Ford Motor Company, Dearborn, Mich.

[21] Appl. No.: 461,947

[22] Filed: Jan. 8, 1990

[51] Int. Cl.$^5$ .............................................. B01J 31/00
[52] U.S. Cl. ................................. 502/159; 502/200; 502/201; 502/230; 502/325; 502/334
[58] Field of Search ............... 502/154, 230, 201, 200, 502/334, 325

[56] References Cited

U.S. PATENT DOCUMENTS

| | | | |
|---|---|---|---|
| 4,020,013 | 4/1977 | Brennan | 502/334 |
| 4,098,727 | 7/1978 | Haag et al. | 502/159 |
| 4,172,047 | 10/1979 | Gandhi et al. | 502/332 |
| 4,179,402 | 12/1979 | Kim et al. | 502/159 |
| 4,179,403 | 12/1979 | Kim et al. | 502/159 |
| 4,274,981 | 6/1981 | Suzuki et al. | 502/200 |
| 4,306,085 | 12/1981 | Kim et al. | 502/159 |
| 4,526,884 | 7/1985 | Tsou et al. | 502/154 |

FOREIGN PATENT DOCUMENTS

| | | |
|---|---|---|
| 2250200 | 5/1974 | Fed. Rep. of Germany . |
| 75180A | 2/1977 | Japan . |
| 184674 | 12/1982 | Japan . |
| 2204851 | 9/1987 | Japan . |

Primary Examiner—Patrick P. Garvin
Assistant Examiner—E. D. Irzinski
Attorney, Agent, or Firm—Joseph W. Mallack; Roger L. May

[57] ABSTRACT

Method of enhancing the catalytic effectiveness of rhodium to reduce nitric oxides: (a) preparing a polymer modifier (molecular weight of 500-50,000) by controllably reacting amine [mono-2-hydroxyl ethyl amine and di-2-hydroxy ethyl amine] with epoxy resin (two or more epoxide groups per molecule) to form a soluble adduct and adding to the adduct a solvent to form a homogeneous amino polymer solution; (b) coating a granular support material (gamma alumina) with rhodium chloride and/or rhodium nitrate compounds; and (c) mixing the coated support material with added amino polymer solution to the support material either prior to or subsequent to step (b) and heating the mixture of polymer solution, support material, and rhodium chloride and/or rhodium nitrate compounds to evaporate the solvent and to decompose and eliminate the polymer, leaving the coated support material with rhodium in a morphologically changed condition devoid of amino polymer but having enhanced catalytic effectiveness for promoting reduction of nitric oxide.

12 Claims, 1 Drawing Sheet

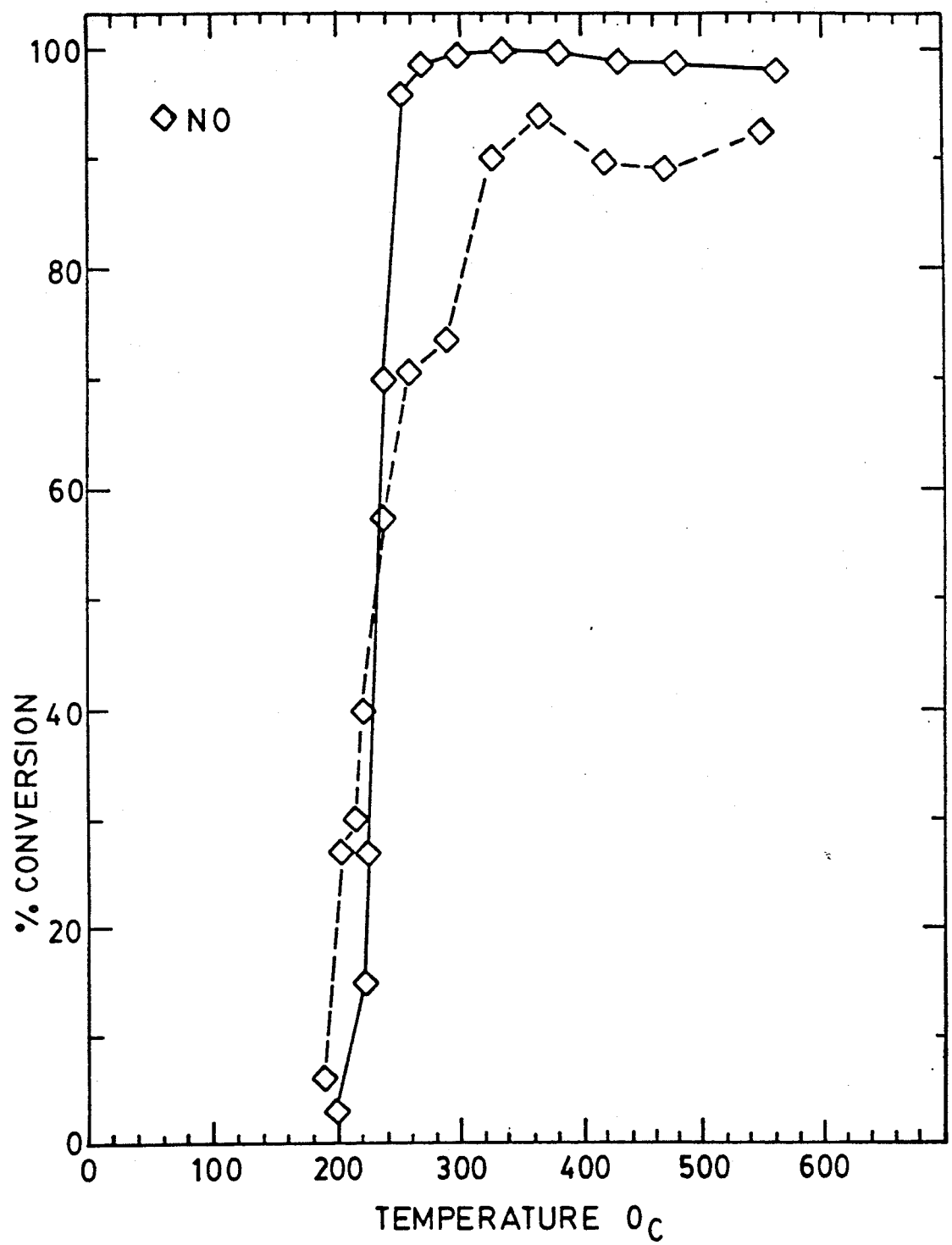

REDUCTION CATALYST WITH MODIFIED RHODIUM STRUCTURE

BACKGROUND OF THE INVENTION

Technical Field

This invention relates to the art of making rhodium-alumina catalysts useful in the conversion of nitrogen oxides contained within the exhaust stream of an internal combustion engine, and more particularly to the use of amino polymers for enhancing the conversion efficiency of catalyst metals.

Discussion of the Prior Art

Rhodium-containing inorganic compounds (i.e., rhodium nitrate, [(Rh(NO$_3$)$_3$], rhodium chloride RhCl$_3$, and amino rhodium complexes) have been used in the making of reduction catalysts for some time (see Japanese patents 84-184674/30 and 75180A/42; U.S. Pat. Nos. 4,172,047 and 4,020,013). Amino polymers have been used with catalyst metals to obtain increased conversion efficiency for certain chemical reactions. Such catalyst metal-amino polymers have been permanently bonded to the catalyst metal and thus limited to low temperature catalytic applications because such polymers decompose at higher temperatures. Such bonded polymers are not suitable for automotive applications which demand high temperature performance (see U.S. Pat. Nos. 4,098,727; 4,179,402; 4,179,403; 4,306,085; and 4,526,884).

It would be desirable to obtain enhanced level of reduction efficiency for nitrogen oxides by a catalyst prepared with the economy of rhodium chloride or nitrate compounds and without the need for permanent bonding of amino polymers.

SUMMARY OF THE INVENTION

This invention has discovered that sacrificial use of amino polymers will modify the crystal structure of rhodium derived from chlorine or nitrate compounds accompanied by unique enhancement of its conversion efficiency for nitric oxides.

A method encompassing this discovery for enhancing the catalytic effectiveness of rhodium to reduce nitric oxides, comprises: (a) preparing a polymer modifier by controllably reacting amine with epoxy resin to form a soluble adduct and adding to the adduct a solvent to form a homogeneous amino polymer solution; (b) coating a support material with rhodium chloride and/or rhodium nitrate compounds; and (c) mixing the coated support material with added amino polymer solution to the support material either prior to or subsequent to step (b) and heating the mixture of polymer solution, support material, and rhodium chloride and/or rhodium nitrate compounds to evaporate the solvent and to decompose and eliminate the polymer, leaving the coated support material with rhodium in a morphologically changed condition devoid of amino polymer but having enhanced catalytic effectiveness for promoting reduction of nitric oxide.

Preferably, the amine is a secondary amine selected from the group including mono-2-hydroxy ethyl amine and di-2-hydroxy ethyl amine. The epoxy is preferably a soluble resin comprising two or more epoxide groups per molecule and advantageously is derived from dihydric phenol or dihydric alcohol. The polymer modifier is preferably a soluble amino polymer having a molecular weight of 500–50,000 and advantageously is 50% or more by weight of the solution.

The support material is preferably granular and comprises gamma alumina. The rhodium compound is preferably rhodium chloride or rhodium nitrate in acidified aqueous solution.

The polymer modifier and rhodium chloride or nitrate compound are mixed so that the equivalent weight of the amino moiety (amino functionality) is 0.5–10.0 times the weight of the rhodium. The nitrogen ratio of the polymer is adjusted according to the equivalent tertiary amine so that the polymer complexes with the rhodium. Rhodium is loaded on the alumina granules in an amount of 0.02–1.0% by weight of the entire catalyst, including the alumina.

Preferably, the amino polymer modifier is prepared by dropwise addition of amine to epoxy to avoid any exothermic reaction. Heating is carried out not only to complete the epoxy amine reaction, preferably by stirring at about 50° C. for 2–5 hours, but also heating is carried out to evaporate the solvent and to decompose and eliminate the polymer modifier and to stabilize the crystalline structure of the rhodium. Such latter heating is preferably carried out in two stages: first by heating to 350° C. for two hours, and thence to 650° C. for 18 hours.

SUMMARY OF THE DRAWINGS

FIG. 1 is a graphical illustration of conversion efficiency of NO as a function of exhaust gas temperature for (a) a catalyst prepared in accordance with this invention, and (b) a catalyst prepared according to the prior art; the space velocity for the catalyst structure with respect to the exhaust gas was 30K hr$^{-1}$.

DETAILED DESCRIPTION AND BEST MODE

This invention enhances the efficiency of reducing nitrogen oxides by a method comprising: (a) preparing a polymer modifier by controllably reacting an amine with epoxy resin to form a soluble adduct and adding to the adduct a solvent to form a homogeneous amino polymer solution; (b) coating a granular support material with rhodium chloride or nitrate compounds; and (c) mixing the coated support material with the amino polymer solution and heating the mixture to evaporate the solvent and thence to decompose and eliminate the amino polymer, leaving the coated granules with the rhodium in a morphologically changed condition devoid of amino polymer with an enhanced catalytic effectiveness for promoting reduction of nitric oxides.

The polymer preferably is an organic polymer derived from epoxy resins having two epoxide groups per molecule. The epoxy resin is preferably selected of either dihydric phenol or dihydric alcohol based. A large number of these polyepoxide resins are known to those skilled in the art. Examples of such polyepoxide resins are those derived from a dihydric phenol or dihydric alcohol and an epihalohydrin. Examples of the latter are epichlorohydrin, epibromohydrin, and epiiodohydrin, with epichlorohydrin being preferred. Dihydric phenols and dihydric alcohols are exemplified by resourcinol, hydroquinone, Bisphenol A, p, p'-dihydroxy benzophenone, p, p'-dihydroxy biphenyl, p, p'-dihydroxy diphenyl ethane, bis (2-hydroxy naphthyl) methane, 1, 5-dihydroxy naphthaline, ethylene glycol, propylene glycol, 1, 4-butane diol, hydrogenated Bisphenol A, 1, 4-cyclohexane diol, 1, 3-cyclopentane diol, cyclohexane dimethanol, and the like. These polyepoxide resins, as is well known in the art, are made in desired molecular weights by reacting the epihalohydrin and the diols in various ratios, or by reacting a dihydric phenol with a lower molecular weight polyepoxide resin. Other polyepoxide resins are glycidyl polyethers of Bisphenol A, phenol-aldehyde, melamine-formaldehyde, urea-formaldehyde, polyalkylene-formaldehyde, and polystyrene resins.

The amine functional group to be contained by the polymer are tertiary amines, which may include mono-2-hydroxyethylalkyl amine, di-2-hydroxyethyl amine, or tri-2-hydroxyethyl amine groups. The nitrogen atom in these amine groups may be substituted with aromatic or aliphatic groups. Amine groups containing at least one 2-hydroxyalkyl groups are preferred.

The amine and epoxy resin are reacted in a controllable manner such as by dropwise addition to control the exothermic reaction therebetween. The reaction mixture is then heated at a temperature of about 60° C. for several hours to homogenize the reaction product, and then a solvent, such as ethanol or acetone, is added in an amount of about 50% solution. This solution is then heated to obtain a homogeneous solution, such as to a temperature of 50°-75° C. for about 2-5 hours.

The polymer containing the functional group of tertiary amines has the general formula as below:

preferred that the surface area of the monolithic structure provide 50-1000 m² per liter of structure, as measured by $N_2$ adsorption. Cell density should be maximized consistent with pressure drop limitations and is preferably in the range of 200-800 cells per square inch of cross-sectional area of the structure.

Alumina must be the dominant or substantial ingredient of the support (at least 50% by weight) because it has high surface area, good adhesion, and low precious metal/support chemical interaction.

The last essential step is carried out by mixing in a predetermined proportion the polymer modifier with the rhodium compound coated granules. Such proportion should be in the range of 0.5-10.0 by weight of modifier to the rhodium metal. The proper proportioning will depend in some part upon whether the polymer modifier is of a long chain or short chain. Essentially, the equivalent weight of the amino moiety (amino functionality) should be 0.5-10.0 times the weight of the rhodium. The nitrogen ratio of the polymer is adjusted or employed according to the equivalent resulting weight of the tertiary amine in the resulting reaction product of the epoxy and amine. The tertiary amine is one that will complex with the rhodium. The polymer may be deposited before or after deposition of the precious metal catalyst.

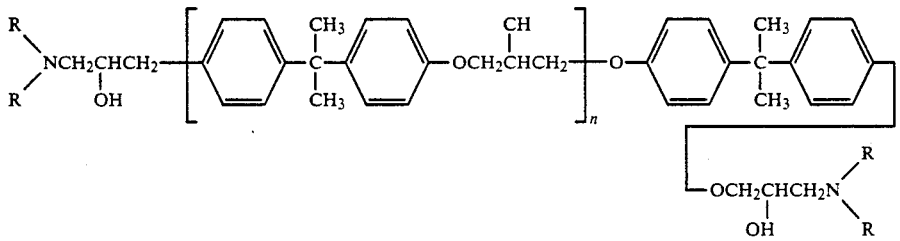

R=alkyl, 2-hydroxyethyl, or aromatic.

The support material, which is preferably granular gamma alumina, or any of the other materials such as silica, titania, or zirconia, is coated with rhodium chloride or nitrate compounds. Coating of the granular material is carried out by forming an acid solution of desired concentration and adding thereto the gamma alumina particles (mesh 20-40). The mixture of granular material and acid solution is then stirred continuously at a temperature of about 100° C. to evaporate the water.

The support may contain alkaline or rare earth oxides. "Support" is used herein to mean a material having a high surface area per unit volume and a good adhesion for precious metal applied thereto; "carrier" is used herein to mean a material having a low surface area per unit volume and a poor adhesion to precious metals if applied thereto; "catalyst" or "catalyst construction" is used herein to mean the aggregation of support and catalytic compound excluding the carrier. A mechanical carrier is preferably comprised of a monolithic silicate structure (i.e., cordierite), although the configuration of which is not critical to the catalyst of this invention. The volume of the structure is measured by its exterior dimensions. It is preferred that the micropore volume of the silicate material be relatively low and the macropore volume provide at least about 90% with pore diameters greater than 2000 angstroms. The surface area of the carrier, as opposed to the material of which the structure is made, should be maximized consistent with pressure drop limitations for the particular application of the catalytic system of this invention. It is The mixture is stirred at 50°-100° C. to evaporate the ethanol. Then the mixture is heated to decompose and eliminate the polymer modifier from the mixture, such as by heating to 350° C. for about two hours and thence at 650° C. for 18 hours.

The product resulting from the practice of such method is amino polymer modified rhodium, a composition characterized by (i) a higher conversion efficiency for reducing nitrogen oxides which is at least 10-20% greater than that for a nonmodified rhodium composition, and (ii) a light-off temperature for the rhodium catalyst (at about 50% efficiency) which is at or below a temperature of 230° C.

To test the effectiveness of the modified catalyst of this invention, catalysts with and without the features of this invention were tested in a flow reactor for $NO-H_2$ reaction, as shown in FIG. 1. The synthesized exhaust gas contained 1000 ppm NO and 1% $H_2$. The catalysts were tested at a space velocity of 30K $hr^{-1}$. The amount of rhodium loading on the support was 40 g/ft³ (1% by weight of catalyst and support), whether with the polymer modification or without the polymer modification of the rhodium. The rhodium in each case was heated to 605° C. for about five hours prior to being utilized in exhaust gas tests.

Thirty-six ml of rhodium nitrate solution (0.0139 g per ml in water) was placed in a beaker and 30 ml of water added to it. Gamma alumina (30 mesh), 49.5 g, was added to this solution and stirred to obtain a homogeneous blend and then placed in an oven at 115° C. and dried overnight. Diglycidyl bisphenol A, 10 g, was placed in a beaker and a solution of 4.5 g diethanolamine in 20 ml ethanol was added to it. The reaction mixture was heated at 60° C. for two hours. Ten grams of the coated alumina was treated with 15 ml of the ethanol solution containing 0.5 ml of the polymer solution. The mixture was stirred and dried at 95° C. This polymer coated material and 6 g of the starting Rh impregnated alumina were placed in an oven in separate crucibles at 290° C. for one hour and at 605° C. for five hours. Both the catalysts were tested in a flow reactor for nitric oxide reduction with hydrogen.

As shown in FIG. 1, the polymer modified rhodium had a maximum conversion efficiency of over 99%, which is about 6% greater than that achieved without the modification. The light-off temperature (at 50% conversion efficiency) was the same as that for the catalyst without the polymer modification.

The increase in reactivity is about the same for the rhodium modified catalyst even when operated at a higher space velocity such as 60K hr$^{-1}$. Much of this enhancement is believed to be due to the change in crystalline structure of the rhodium metal. Since the polymer has strong adhesion to the surface of the alumina because of the hydroxyl group, and because of the strong complexing with rhodium due to the amino and hydroxy groups, the solidification dynamics during the making of the crystals is modified. Only certain of the amino complexes will work in this manner. The resulting modified rhodium material is considered a new composition of matter particularly useful in high temperature catalyst conversion environments.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

What is claimed:

1. A method of enhancing the catalytic effectiveness of rhodium to reduce nitric oxides by sacrificial use of polymers, comprising:

(a) preparing an adhesive polymer modifier by controllably reacting amine with epoxy resin to form a soluble adduct and adding to the adduct a solvent to form a homogeneous amino polymer solution, said amine being a secondary or primary amine selected from 2-hydroxy alkyl mono or diamine, said epoxy resin being a soluble copolymer having two or more epoxide groups per molecule;

(b) coating an alumina support material with a rhodium compound; and (c) adding the amino polymer modifier solution to the support material either prior to or subsequent to step (b) and heating such mixture of polymer solution, support material, and rhodium compound to evaporate the solvent and decompose and eliminate the polymer modifier, leaving the coated support material with rhodium in a morphologically changed condition devoid of the polymer modifier with enhanced catalytic effectiveness for promoting reduction of nitric oxides.

2. The method as in claim 1, in which said epoxy resin is derived from a dihydric phenol or a dihydric alcohol.

3. The method as in claim 1, in which said polymer modifier has a molecular weight of 500–50,000 and is devoid of a gel or cross-linking.

4. The method as in claim 1, in which said polymer modifier in solution constitutes at least 50% of said solution.

5. The method as in claim 1, in which said support material is gamma alumina.

6. The method as in claim 1, in which said rhodium compound is selected from the group consisting of rhodium chloride, rhodium nitrate, or amino rhodium compounds.

7. The method as in claim 1, in which said polymer modifier is added prior to or subsequent to rhodium impregnation.

8. The method as in claim 1, in which said polymer is added to the rhodium compound solution in a predetermined ratio of 0.5–10.0 times the weight of the rhodium metal.

9. The method as in claim 1, in which said rhodium is loaded on said support material in an amount of 0.02–1.0% by weight of the entire catalyst, including said support.

10. The method as in claim 1, in which in step (c) the mixture is heated to about 95° C. for about 2–5 hours and stirred to dry the mixture.

11. The method as in claim 1, in which said heating to decompose and stabilize consists preferably of heating to 290° C. for about one hour, and thence to 605° C. for about five hours.

12. The product resulting from the practice of claim 1, which is characterized by an amino polymer modified rhodium composition having (i) a maximum conversion efficiency for nitric oxides of at least 99%, and (ii) a light-off temperature (at 50% conversion efficiency) which is no greater than 230° C.

* * * * *